Figures 1, 2, 3:
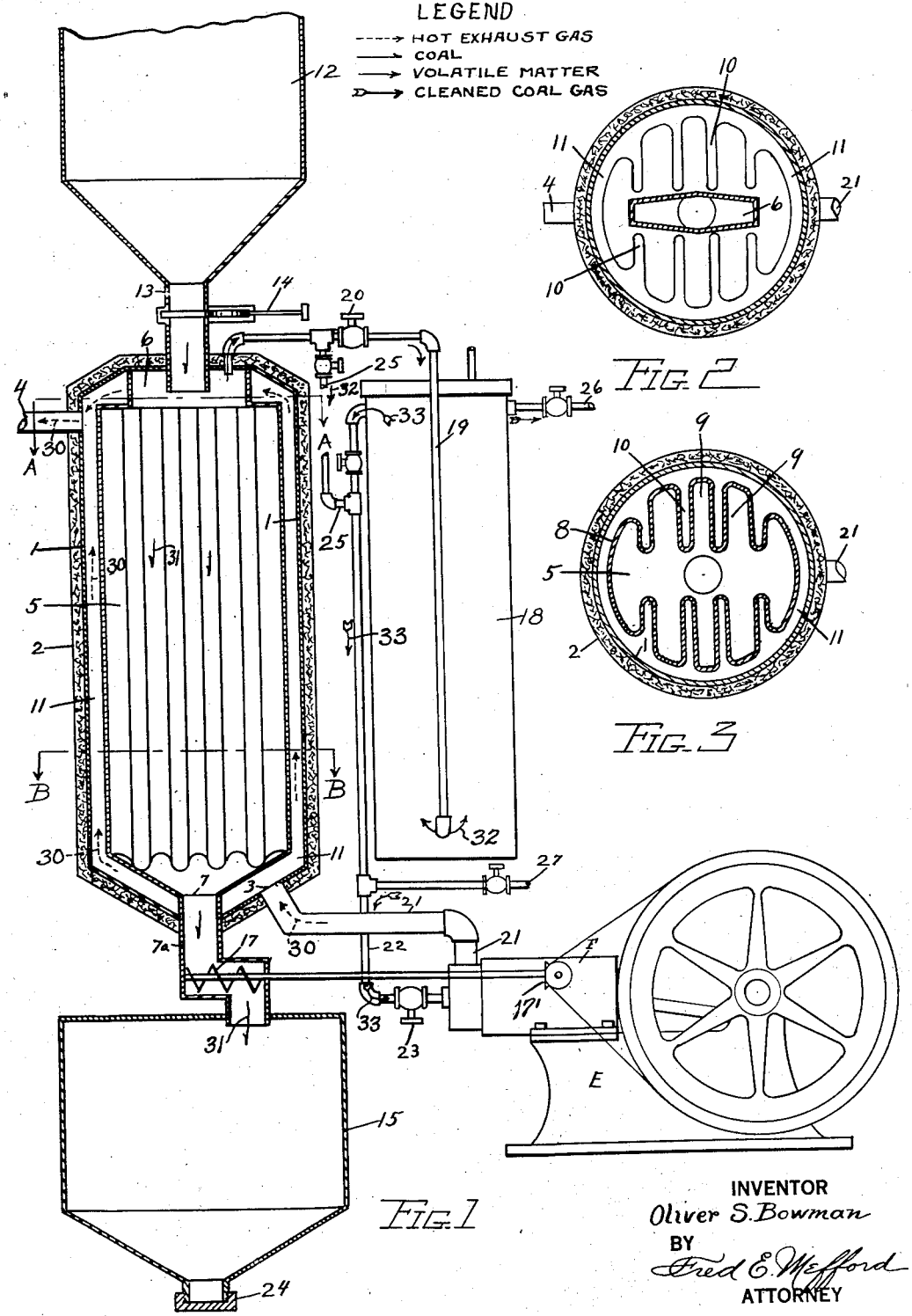

May 10, 1932.  O. S. BOWMAN  1,858,135

COAL CARBONIZING POWER PLANT AND METHOD OF REDUCING COAL

Filed Jan. 12, 1925

LEGEND
- - - → HOT EXHAUST GAS
⟶ COAL
⟶ VOLATILE MATTER
⟹ CLEANED COAL GAS

INVENTOR
Oliver S. Bowman
BY Fred E. Mefford
ATTORNEY

Patented May 10, 1932

1,858,135

UNITED STATES PATENT OFFICE

OLIVER S. BOWMAN, OF COLORADO SPRINGS, COLORADO

COAL CARBONIZING POWER PLANT AND METHOD OF REDUCING COAL

Application filed January 12, 1925. Serial No. 2,048.

My invention relates to power plants, and comprises an internal combustion engine and a novel coal carbonizing apparatus as essential members. My object is to provide a coal carbonizing power plant the engine of which derives its own gaseous fuel directly from coal by means of a novel coal carbonizing member operating on heat derived wholly from the exhaust gases of said engine.

Other objects will appear as the description progresses.

For illustrative purpose I have shown a one cylinder gas engine and one form of my carbonizer member, but I do not thereby limit myself to a one cylinder engine or to the precise details of construction of the carbonizing member as shown, but wish it understood that engines having a plurality of cylinders may be used and that various modifications and details of construction of the carbonizing member may be made within the scope of the claims.

Figure 1 represents a schematic elevation of the apparatus, partly in section; Fig. 2, a section of the carbonizing member on the line A—A, and Fig. 3, a section of the carbonizing member on the line B—B in Fig. 1.

My power plant comprises a drum 1, covered with insulation 2, having a lower intake port 3 and an upper exhaust port 4; a magazine 5 having an upper gas chamber 6, a lower outlet conduit 7a and a corrugated wall 8 forming a plurality of vertical inner chambers 9, all communicating, and a plurality of vertical outer channels 10, said magazine being positioned within drum 1 to form a surrounding channel 11 in communication with outer channels 10; a coal hopper 12, mounted above magazine 5 and in communication therewith via conduit 13 having valve 14; a residue receptacle 15, disposed below said mazagine and in communication therewith via conduit 7a having screw conveyor 17 actuated by gearing 17′ on the engine; a scrubber 18, having a pipe 19 with valve 20, extending therefrom into gas chamber 6; an internal combustion engine E having its exhaust conduit 21 in communication with surrounding channel 11; a pipe 22, having a valve 23, connecting scrubber 18 with the fuel intake port of engine E.

Coal is introduced from hopper 12 through conduit 13 into magazine 5, where it is carbonized by heat derived from the exhaust gases from the engine, which enter channels 11 and 10 via conduit 21 and escape through port 4. The carbonized coal flows by gravity toward and passes through conduit 7a into residue receptacle 15, from which it falls when cap 24 is removed. The speed of screw conveyor 17 is so timed that the coal remains in magazine 5 during the period required for its carbonization a continuous flow of coal and carbonized residue is thus maintained. The gas derived from the carbonization of the coal in magazine 5 is drawn out, via pipe 19, through scrubber 18, thence through pipe 22 into cylinder F of engine E. The gas may be drawn from gas chamber 6 through pipes 19 and 25 directly into engine cylinder F; or it may be passed from scrubber 18 through pipe 26 into a reservoir (not shown) and thence through pipes 27 and 22 into engine cylinder F, thus providing a supply of fuel to initiate operations. The flow of the hot exhaust gases is shown by broken arrows 30, the flow of the coal is indicated by the single barbed arrows 31, the flow of the volatile matter from the carbonized coal is shown by the tailless arrows 32 and the flow of the cleaned coal gas or engine fuel is indicated by the feathered arrows 33.

Therefore, my power plant, comprising an internal combustion engine as an essential member, derives the heat required to carbonize coal from the exhaust gases of the engine in which the gas resulting from carbonization is burned as fuel. Whereas, present types of carbonizers burn a major portion, or all of the gas incident to carbonization to provide the heat required to effect carbonization, and present types of producer-gas plants derive engine fuel from coal by a process of partial combustion, consisting of carbon monoxide and hydrogen gas.

I claim:

1. In combination, an engine adapted to discharge hot exhaust gases, a carbonizer including two passages in mutual heat exchange relation, means for feeding low grade carbonaceous fuel thru one of the passages of said carbonizer, means for passing said hot exhaust gases from said engine thru the other passage of the carbonizer to provide the necessary heat units to carbonize the low grade fuel, means for conducting gas from said one of the passages to the engine, and means controlled by said engine for controlling the discharge of carbonized fuel from the said one of the passages.

2. In a unitary system for carbonizing coal, a retort for reducing the coal having a coal compartment in heat-transfer relation with a heat-medium compartment, means for feeding coal into one part of said coal compartment and means for withdrawing coke from another part of said coal compartment, an internal combustion engine, means for withdrawing volatile matter from said coal compartment and feeding same to said internal combustion engine, means for conducting exhaust gases from said engine to said heat-medium compartment, means for connecting said engine to the coke withdrawing means for operating the same.

3. In a unitary system for carbonizing low grade coal, a retort having a coal chamber and a hot gas chamber in heat transfer relation, an internal combustion engine, said coal chamber having a coal feed port, a carbonized coal outlet port and a gas outlet port, said hot gas chamber having an exit connection and an entrance connection with the exhaust port of the engine, means connecting said gas outlet port with said engine, a conveyor in said carbonized coal outlet port, said conveyor being connected to be driven by said gas engine.

4. The method of converting coal into mechanical energy, coke, coal tar and coal gas which comprises coking the coal by transferred heat, separating the coal gas and coal tar from the evolved fluid matter, changing part of the coal gas into hot gases and mechanical energy, transferring the heat from the hot gases into said transferred heat, and separating the coke from the unreduced coal by means of part of said mechanical energy.

5. The method of treating coal which comprises the steps of slowly moving the coal thru a region of heat thereby decomposing the coal, drawing the evolved fluid matter from said region of heat, separating the gas from the evolved fluid matter, converting the gas into mechanical energy and hot combustion gases, creating said region of heat by said hot combustion gases, and removing the decomposed coal from said region by part of said mechanical energy.

OLIVER S. BOWMAN.